United States Patent
Hassan et al.

(10) Patent No.: US 12,273,766 B2
(45) Date of Patent: Apr. 8, 2025

(54) METHOD AND APPARATUS FOR CONGESTION CONTROL IN A TELECOMMUNICATIONS NETWORK

(71) Applicant: Fraunhofer-Gesellschaft zur Förderung der angewandten Forschung e.V., Munich (DE)

(72) Inventors: Khaled Hassan, Erlangen (DE); Shubhangi Bhadauria, Erlangen (DE); Elke Roth-Mandutz, Erlangen (DE); Martin Leyh, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 232 days.

(21) Appl. No.: 17/299,566

(22) PCT Filed: Dec. 10, 2019

(86) PCT No.: PCT/EP2019/084379
§ 371 (c)(1),
(2) Date: Jun. 3, 2021

(87) PCT Pub. No.: WO2020/126657
PCT Pub. Date: Jun. 25, 2020

(65) Prior Publication Data
US 2022/0060929 A1    Feb. 24, 2022

(30) Foreign Application Priority Data
Dec. 17, 2018    (EP) .................... 18213058

(51) Int. Cl.
*H04W 28/02* (2009.01)
*H04W 72/542* (2023.01)

(52) U.S. Cl.
CPC ... *H04W 28/0268* (2013.01); *H04W 28/0231* (2013.01); *H04W 72/542* (2023.01)

(58) Field of Classification Search
CPC .......... H04W 72/542; H04W 28/0268; H04W 28/0231; H04W 72/40; H04W 28/0284; H04W 72/02; H04W 28/0252
See application file for complete search history.

(56) References Cited

U.S. PATENT DOCUMENTS

| | | | |
|---|---|---|---|
| 2019/0215801 A1* | 7/2019 | Mok | ...................... H04W 76/27 |
| 2019/0253927 A1* | 8/2019 | Mok | ................ H04W 28/0268 |

(Continued)

FOREIGN PATENT DOCUMENTS

| | | |
|---|---|---|
| WO | WO2018/027800 A1 | 2/2018 |
| WO | WO2018/081979 A1 | 5/2018 |

(Continued)

OTHER PUBLICATIONS

International Search Report issued by the European Patent Office for Application No. PCT/EP2019/084379, Feb. 12, 2020.

(Continued)

*Primary Examiner* — Walter J Divito
(74) *Attorney, Agent, or Firm* — Burr & Forman LLP

(57) ABSTRACT

The embodiments herein relate to a method performed by a UE (800) capable for sidelink communications, for congestion control in a wireless telecommunications network, wherein the UE is allocated one or more resource pools, the method comprising: performing (701) CBR/CR measurements on said at least one resource pool to generate CBR/CR value(s); wherein the measurements are performed over a sensing window which is either pre-configured or adapted based on the QoS of at least one data packet or at least one service, and selecting (702) a resource pool or at least one resource within the resource pool based on a CBR/value and QoS requirements of the data packet or the service for transmission.

13 Claims, 8 Drawing Sheets

(56) References Cited

U.S. PATENT DOCUMENTS

2020/0029245 A1* 1/2020 Khoryaev ............. H04W 36/22
2020/0221467 A1* 7/2020 Huang ................ H04W 72/542
2021/0219268 A1* 7/2021 Li ......................... H04W 72/20

FOREIGN PATENT DOCUMENTS

WO    WO2018/145067 A1    8/2018
WO    WO 2018175822 A1    9/2018

OTHER PUBLICATIONS

3GPP TSG-RAN WG2#104, Spokane, USA, Nov. 12-16, 2018—R2-1816990—Discussions on NR V2X Mode 2 Alternatives, ZTE, Sanechips.

3GPP TS 36.214 V15.3.0 (Sep. 2018), 3rd Generation Partnership Project; Technical Specification Group Radio Access Network: Evolved Universal Terrestrial Radio Access; Physical Layer; Measurements, (Release 15).

3GPP TSG RAN WGI Meeting #95, Spokane, USA, Nov. 12-16, 2018, R1-1813165, QoS Management for NR V2X, InterDigital, Inc.

3GPP TSG RAN WG2 Meeting #100, Reno, USA, Nov. 27-Dec. 1, 2017, R2-1712629, Further Considerations on Packet Duplication for CA Based eV2X, Intel Corporation.

3GPP TSG-RAN WG2 Meeting 104, Spokane, USA, Nov. 12-16, 2018, R2-1818207, Further Consideration on Tx Carrier (re)selection in NR V2X—ITL.

3GPP TSG-RAN WG1 Meeting #89, Hangzhou, P.R. China, May 15-19, 2017, R1-1707107, Discussion on Latency Reduction of Resource Selection, Xinwei.

3GPP TSG RAN WGI Meeting #95, Spokane, USA, Nov. 12-16, 2018, R1-1814304, On Relationship Between SL BWP and Uu BWP, Huawei, HiSilicon.

Chinese Patent Application No. 201980083485.6, Second Office Action Drafted by Lian Qin, Examiner on Aug. 17, 2024.

* cited by examiner (State of The Art)

METHOD AND APPARATUS FOR CONGESTION CONTROL IN A TELECOMMUNICATIONS NETWORK

TECHNICAL FIELD

The present disclosure relates to the field of wireless communications and in particular, to congestion resolution and latency reduction in a sidelink-based wireless telecommunications network.

BACKGROUND

Admission control in NR-Uu interface, also called the New Radio air interface between a Third Generation Partnership Project (3GPP) User Equipment (3GPP UE) of the 5G network and the 5G-RAN (Radio Access Network) is based on explicit bearer request and configuration signaling.

A similar state of the art mechanism may be used for SideLink (SL) when it is in a network-controlled mode. In this case, before activating any V2X (Vehicle-to everything) service, a NR SL UE is configured to request a corresponding Data Radio Bearer (DRB) from the radio base station (also known as a gNB in 5G). If the request is accepted by the radio base station, the latter will send a new bearer configuration back to UE. In case the channel becomes congested and there are new bearer request(s), the radio base station gNB may prioritize transmissions, which is currently studied in the NR V2X study item in 3GPP Release 16 (Rel. 16). In this context pre-emption is proposed as an extension of the URLLC (Ultra-Reliable Low Latency Communication) mechanisms, i.e. URLLC services that have stringent requirements in terms of e.g. delay, data rate etc.

Cellular V2X (C-V2X) will serve the foundation for vehicles to communicate with each other and everything around them providing 360° non-line-of-sight awareness and a higher level of predictability for enhanced road safety and autonomous driving.

Sidelink is an adaptation of the core 3GPP Long Term Evolution (LTE) standard that allows direct communication between two LTE devices or 5G devices without going through a radio base station or eNB or gNB. Sidelink communications may also be called D2D communications which stands for Device-to-Device communications.

One of the challenges a wireless network has to deal with is the congestion caused by large number of devices and applications. 3GPP defines metrics to characterize the channel state:

CBR: (Channel Busy Ratio) is defined as the portion of sub-channels in a resource pool whose received Signal Strength Indicator (RSSI) exceeds a (pre) configured threshold observed during a CBR measurement period of 100 ms. The CBR is thus calculated by sensing over a fixed period of 100 ms.

CR: (Channel occupancy Ratio) is evaluated at sub-frame n and is defined as the total number of sub-channels used by the UE for its transmissions divided by the total number of configured sub-channels in the transmission pool. In short, CR defines for the UE the percentage of time/frequency the UE may be able to transmit.

The existing CBR measurements might help the radio base station or gNB to avoid allocating resources to congested channels. However, it has been proposed in previous 3GPP releases to indicate the CBR for the autonomous resource allocation mode without a room for optimization to enhance performance while facing congestion situation. The legacy system allows only to have pre-configuration of certain (pre-selected) CBR thresholds and the corresponding CR. This is valid for mode 1 V2X communication, controlled by a gNB, or mode 2 V2X communication which can be autonomously scheduled or assisted via network signaling (e.g., RRC/SIB (Radio Resource Control/System Block Information) etc.). Additionally, an overriding from the network signaling may be considered for a supervised autonomous mode, i.e., mode 2 in 3GPP V2X. Mode 1 V2X and mode 2 V2X are defined below:

Mode 1: The base station (or gNB) is configured to schedule sidelink resource(s) to be used by the UE for sidelink transmission(s).

Mode 2: the UE is configured to determine (i.e. the base station does not schedule) sidelink resource(s) within sidelink resources configured by the network/base station or pre-configured sidelink resources.

Mode 2 V2X communication which is autonomously scheduled follows a sensing procedure illustrated in FIG. 1 according to the State of The Art (SoTA). Sensing is a process based on power sensing and measurements and/or based on decoding reservation information in the Sidelink Control Information (SCI). The sensing can be used for resource selection and CBR computations.

As shown in FIG. 1, the size of the sensing window is 1000 sub-frames (sf). The UE continuously monitors the sub-frames for the duration of the sensing window. The UE checks the decoded SCIs in order to check the remaining transmissions. The UE also checks the Sidelink RSSI measurements. When a resource is triggered at time n (e.g. due to an incoming packet from the upper layer), the potential resources or candidate resources from $n+T_1$ until $n+T_2$ are checked. The time period from $n+T_1$ to $n+T_2$ is called the resource selection window. P is the period of the resource reservation.

The resource allocation granularity is T_slot, where T_slot is the NR slot duration i.e. based on numerology and number of symbols in a slot (i.e. from 1 to 14). The NR slot duration is not necessarily fixed.

From the PHY layer's perspective, the smallest entity that can be allocated is one Resource Block (RB) (plus control information which could be either spread out across time e.g. in TDM (Time Division Multiplexing) or across frequency e.g. in FDM (Frequency Division Multiplexing)).

L sub-channels, in FIG. 1, is the number of sub-channels allocated for transmission in a T_slot. If the MAC layer requests a sensing report from the lower layers at a slot number $n^{th}$ T_slot the lower layer or the PHY layer extracts the sensing window from its channel record buffer:

PHY layer should react in a time less than $n+T_1$ (1 to 4 slots)

After the first transmission in $n+T_1$, another scheduling or reservation can be done in $n+T_2$.

It should be noted that $T_2$ can be between 0 to 100 ms. In LTE, $T_2$ is between 20 and 100 T_slots.

From the 3GPP LTE standardization and the ITS standard 802.11p and as described by ETSI (ITS 103.175 ver. 1.1.1), it was proposed to design a mandatory Decentralized Congestion Control (DCC) framework to keep the channel load below a specific level to avoid congestion. DCC algorithms are used to tune one or more parameters such as a transmit power, a message rate, a Modulation and Coding Scheme (MCS), and a data-rate to avoid congestion. However, they all cause a trade-off of various application requirements such as a message rate and a range, which may adversely affect safety-application and reliability.

For example, a reduction of the transmission power results in a shorter communication range and, therefore, less awareness of the vehicles in the far neighborhoods. Thus, it is important that DCC avoids congestion while satisfying the application requirements.

There are other types of DCC, such as reducing the message rate; however, this might cause a drop of important messages at the transmitter side (UE side) (e.g. self UE TX buffer congestion). Another option is to compress more data (higher data rate/higher coding rate) in the same amount of resources. This will also affect the reliability at the UE with lower SINR (Signal to Interference Noise Ratio) reception.

In the Rel. 15 LTE V2X the sidelink communication is broadcast-based. With the Rel. 16 the advanced use cases in the New Radio (NR) need groupcast-based sidelink communication. Examples of advanced use cases include the vehicle platooning and advanced driving, disclosed in the 3GPP Technical Report (TR) 22.886.

SUMMARY

In view of the problems disclosed earlier, the present disclosure and its embodiments provide solutions to at least the following questions:

How can NR sidelink communication with high Quality of Service (QOS) (for e.g. extremely delay critical services or URLLC services) be supported by a congestion resolution mechanism to avoid an increase in latency? In Rel. 15, the congestion resolution mechanism introduces more latency.

How to avoid congestion while satisfying the application requirements?

How to avoid a drop of important messages at the transmitter side (UE side)?

How to ensure reliability at the UE side experiencing lower SINR reception?

It is thus an object of embodiments herein to provide a congestion resolution mechanism that solves the above stated problems.

According to an aspect of embodiments herein, there is provided a method for congestion control performed by a UE according to some example embodiments.

According to an aspect of the embodiments, the method performed by the UE for congestion control in a wireless telecommunications network comprises: performing CBR/CR measurements on one or more resource pools to generate CBR/CR values, wherein the measurements are performed over a sensing period which is either pre-configured by a network node and/or the UE or adapted based on at least a QoS of at least one data packet or at least one service; and selecting a resource pool or at least one resource within a resource pool based on a CBR/CR value and QoS requirements of said at least one data packet or at least one service for transmitting the at least one data packet or the at least one service.

According to an embodiment, the method comprises classifying the resource pools based on the CBR/CR values. The method further comprises mapping the CBR/CR values with respect to different QoS.

According to an embodiment, the method comprises: if the data packet has a high priority in respect to QoS, a resource pool or resources within a resource pool having a CBR and/or CR value below a certain threshold is selected.

According to an embodiment, if the packet is transmitted within a low minimum communication range having high QoS requirements, selecting a resource pool or resources within a resource pool having a CBR and/or CR value below a certain threshold; otherwise, if the packet is transmitted within larger higher minimum communication range, the QoS requirements are lower.

According to an embodiment if the data packet has a QoS profile indicating a latency requirement below a threshold, selecting a resource pool having a CBR/CR value below a certain threshold.

According to an embodiment if the data packet has high reliability and there are multiple resource pools and the resource pools have CBR/CR values higher than a certain threshold, performing data duplication on the multiple resources pools.

The CBR/CR values may be sorted from low CBR/CR (less congested) to high CBR/CR (highly congested).

According to an embodiment, if the UE is allocated to a resource pool with a high CBR/CR value and the UE starts to receive data packets or messages having high QoS, starting a congestion control mechanism by: requesting sidelink resource configurations and a CBR report from a network node for multiple resource pools; providing the network node with information on one or more resource pools having less congestion according to the sorted CBR/CR values; and if the network node accepts the information provided by the UE, receiving a congestion control message, from the network node, indicating information on allocated resources (F) information on a period for the allocation (P) and information on time slots or a transmission time (T).

According to an embodiment, the method comprising, starting a timer for: extending the period for the allocation P based on a QoS of the packet and/or based on a QoS flow; reducing the transmission time T if more than one slot is allocated per transmission occasion; and reducing an allocated band for the allocated resources F by increasing a modulation and coding scheme (MSC) or a transport block size (TBS) if the QoS is supported.

According to an embodiment, if there are multiple resource pools, the method comprises sorting the resource pools in descending order based on the CBR/CR values, and if the data packet has a high QoS, assigning or selecting the first available resource pool with the lowest CBR value selected.

According to an embodiment, the method comprises performing resource selection autonomously from configured grants and/or dedicated configured grants and/or pre-configured resources pools.

According to an embodiment, the method comprises adapting the sensing duration as a function of a QoS profile or a QoS flow of at least one received data packet.

According to an embodiment, if the UE receives a high QoS data packet in its buffer while the UE is performing CRB/CR measurements during a long sensing window for a low QoS data packet, triggering a shorter sensing and adjusting a back-off timer based on a start of the short sensing window.

According to an embodiment, the method comprises: for transmission of the data packet, determining if a medium for transmitting the data packet is busy and that being the case, computing a back-off timer as a function of the QoS of the data packet and at least one CBR/CR value; switching to a resource pool having the lowest CBR/CR value; calculating a probability of persistence P for accessing the media as a function of the QoS and the CBR/CR value; generating a random variable (P_val) of a probability of persistence; and if P is equal to P_val, transmitting the data packet; else transmitting the data packet with a probability of persistence equal to 100%.

According to an embodiment, the resource pools are configured for one or more bandwidth parts or one or more component carriers for sidelink transmissions to one or more UEs.

According to another aspect of embodiments herein, there is also provided an apparatus in the form of a UE according to some example embodiments, the UE containing instructions executable by a processor whereby the UE includes a memory containing instructions executable by said processor whereby the UE is operative to carry out the method according to some example embodiments.

There is also provided a computer program comprising instructions which when executed on at least one processor of the UE according to some example embodiments, cause at least said one processor to carry out the method according to some example embodiments.

A carrier containing the computer program, wherein the carrier is one of a computer readable storage medium; an electronic signal, optical signal or a radio signal.

There is also provided a method performed by a radio network node (or a radio base station or a gNB) and an apparatus in the form of a radio network node for congestion control and wherein the gNB is configured to allocate resources to UE(s) for allowing the UE(s) to perform the steps in some of the example embodiments. The gNB may provide necessary information including allocation of resource information and other information, using RRC signaling or other specific signaling etc. as will be described in detail in the detailed part of the description.

Hence, the disclosure includes both embodiments wherein allocation of the resources is done by the UE or pre-configured by the network or gNB or any suitable network node. The skilled in the art will readily understand from the present disclosure that the solutions described are not limited to the subject-matter disclosed in the example embodiments.

An advantage with embodiments herein is to reduce latency or at least avoid an increase in latency and support high reliability services having high requirements for e.g. advanced V2X use cases defined in at least 3GPP Rel. 15 and Rel. 16.

Another advantage with embodiments herein is to avoid congestion while satisfying the application requirements in terms of QoS.

Another advantage with embodiments herein is to avoid a drop of important messages at e.g. the transmitter side (UE side).

Another advantage with embodiments herein is to ensure reliability at the UE side having lower SINR reception.

BRIEF DESCRIPTION OF THE DRAWINGS

Examples of embodiments and advantages of the embodiments herein are described in more detail with reference to attached drawings in which.

DETAILED DESCRIPTION

Figure 1:
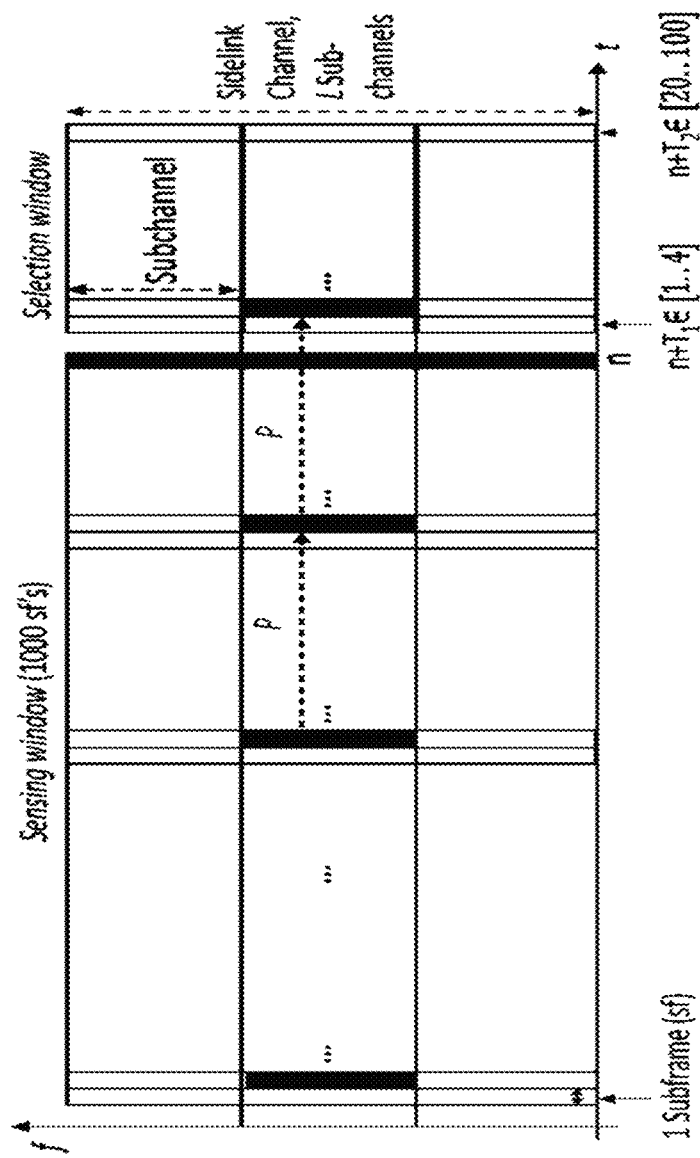
FIG. 1 depicts the SoTA sensing procedure for reporting and transmission.

In the following, a detailed description of the exemplary embodiments is presented with reference to FIGS. 2-8 to enable easier understanding of the solution(s) described herein. Some of the following abbreviations are used herein.

| | |
|---|---|
| NR | New Radio |
| DSRC | Dedicated Short Range Communication |
| SLR | Service Level Requirements |
| CAM | Cooperative Awareness messages |
| DENM | Decentralized Environmental Notification |
| PSCCH | Physical Sidelink Control Channel |
| SCI | Sidelink Control Information |
| HARQ | Hybrid Automatic Repeat reQuest |
| ACK/NACK | Acknowledgement/Negative Acknowledgement |
| DMRS | Demodulation Reference Signals |
| S-RSRP | Sidelink-Received Signal Strength |
| SL | SideLink |
| SFCI | Sidelink Feedback-Control Information |

As mentioned earlier, in 3GPP Rel. 16, advanced use cases are defined in NR like vehicle platooning, advanced driving, and extended sensors that will benefit from the congestion control mechanism according the embodiments herein.

Several of the use cases for advanced V2X services, defined for NR V2X, demand strict latency, reliability and data rates. The congestion control mechanism is used to maintain the system performance in high density scenarios. The Channel Busy Ratio (CBR) is used as a metric to derive the traffic load, which can be measured by UEs and used in the congestion control mechanism. The larger the CBR the more congested the resources are. CBR is an example of a congestion metric or a congestion level.

The congestion control mechanism according to embodiments herein may be assisted by the UEs or controlled by the network or gNB (if available), e.g. mode 1 related.

The exemplary embodiments may be split into E1 and E2 as follows:

1-(E1) According to an embodiment, resources are allocated to one or more resource pools with different congestion levels, where
  a. (E1.1) The QoS may be used to select among different resource pools with different congestion levels/parameters (CBR/CR or other congestion metrics).

Based on different QoS profiles or different QoS values/levels, data may be prioritized and sorted among the available resource pools). Examples of QoS profiles include 5QI which is defined as a scalar that is used as a reference to 5G QoS characteristics defined in clause 5.7.4 of 3GPP TS 23.501, i.e. access node-specific parameters that control QoS forwarding treatment for the QoS Flow. In section 5.7.4 of 3GPP TS 23.501, a one-to-one mapping of standardized 5QI to different QoS characteristics is provided in table 5.7.4-1.

An example of a part of the table 5.7.4-1 which depicts a one-to-one mapping of the 5QI value to different QoS characteristics for different examples of services is presented below.

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 3 (NOTE 14) | | 30 | 50 ms (NOTE 11, NOTE 13) | $10^{-3}$ | N/A | 2000 ms | Real Time Gaming, V2X messages Electricity distribution- medium voltage, Process automation- monitoring |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |

The QoS flows may include the following QoS profiles or QoS fields metrics:

I—Communication range, in steps in meters or radio-distance in dBs (decibels)

II—Packet priority, packet delay, packet reliability

III—Link quality→CSI/CQI (Channel State Information/Channel Quality Information), RSSI, RSRP (Receive Signal Receive Power, RSRQ (Receive Signal Receive Quality), UE link establishment quality (vendor-based), bearer-link quality (network-based), statistical link-quality history, etc.

It should be noted that the resource pool disclosed herein is valid for all cast types i.e. broadcast, groupcast or unicast.

b. (E1.2) In case of pre-configurations (or configurations conveyed by the network), one or more resource pools may be used for congestion control/resolution using a CBR value adapted to the congestion situation by modifying the associated CR values with regards the QoS profiles. Hence, one or more resource pools can be used for congestion resolution when a measured CBR exceeds a CBR threshold. The corresponding CR that the UE is allowed to access for transmission may depend on the QoS profile associated to the data packet the UE has in the buffer.

2. (E.2) According to an embodiment, a QoS based sensing approach may be used to generate congestion measurements or generate congestion measurement reports, where:

An adaptive sensing window and/or a selection/re-selection window is designed as a parameter for QoS and/or resource pool congestion parameters. Hence, for every QoS class-based on e.g. 5QI parameters such as priority, there is an associated sensing window (CBR measurement window) with a specific associated CBR value for the window. For example, for transmissions with given CBR values, a high QoS can perform a faster (short) sensing using e.g. a Listen Before Talk (LBT) approach. The CBR measurement window may be configured by the network based on at least the QoS profile. Other factors may be considered, such as speed, previous CBR measurement history. The CBR measurement window may be pre-configured.

As will be explained, an adaptive back-off window for a short sensing mechanism with an adaptive size may be a function of the QoS and/or the resource pool congestion parameters.

Additionally, a resource pool scaling based on the CBR may be used. An adaptive transmission or resource pool definition scaling may be a function of the QoS and/or resource pool congestion parameters. Hence, once congestion is identified, a UE is configured to scale down the identified resource time/frequency resources to maintain short transmissions. The resource pools are hence not fixed with respect to time and frequency. The resource pools could be extended in time and/or in frequency depending on the QoS and if a resource pool is congested a short transmission is maintained and could be expanded in frequency but in time it is limited.

An adaptive persistence transmission probability may be a function of the QoS and/or the resource pool congestion parameters.

The following assumptions are considered:

The UE generates data packets to transmit, hence the UE has one or more packets in its buffer.

The UE may receive packets from the gNB and these packets may be routed to another UE (either as a relay or according to the application layer requirements) using side-link communication.

The UE has at least one configured grant from the gNB via Radio Resource Control (RRC) signalling. The configuration indicates transmission with a pattern on one or more resource pools.

The UE is configured to transmit autonomously on one or more resource pools.

The UE follows a pre-configuration to transmit on one or more pre-configured resources pools autonomously.

Among the available resource pools, one or more resource pools may be dedicated for congestion control.

According to embodiments herein, the congestion control may be handled in either operational mode 1 or operational mode 2 for sidelink communication currently defined for NR V2X. As previously described in mode 1, the radio base station or a radio network node is configured to schedule sidelink resource(s) to be used by the UE for sidelink transmission. In mode 2, the UE is configured to determine (i.e. the base station does not schedule) sidelink transmission resources within sidelink resources configured by the base station or the network or these resources may be pre-configured.

E1: (E1.1) QoS Resource Pool Selection

According to this embodiment, the resource pool selection is classified based on the congestion levels to allow the congestion control mechanism. An example of a congestion level is the CBR and CR measurement of a resource pool.

According to another embodiment, a resource pool may be identified by the network/gNB or the resource pool may be pre-configured to the UE to handle the congestion resolution.

It is assumed that there are one or more resource pools for transmissions, where the UE performs CBR/CR measurements on each resource pool separately. It is further assumed that one or more resources pools are configured/pre-configured for congestion resolution.

The resource pools may be configured for one or more bandwidth parts (BWP) or one or more component carriers for sidelink operation.

Figure 2:
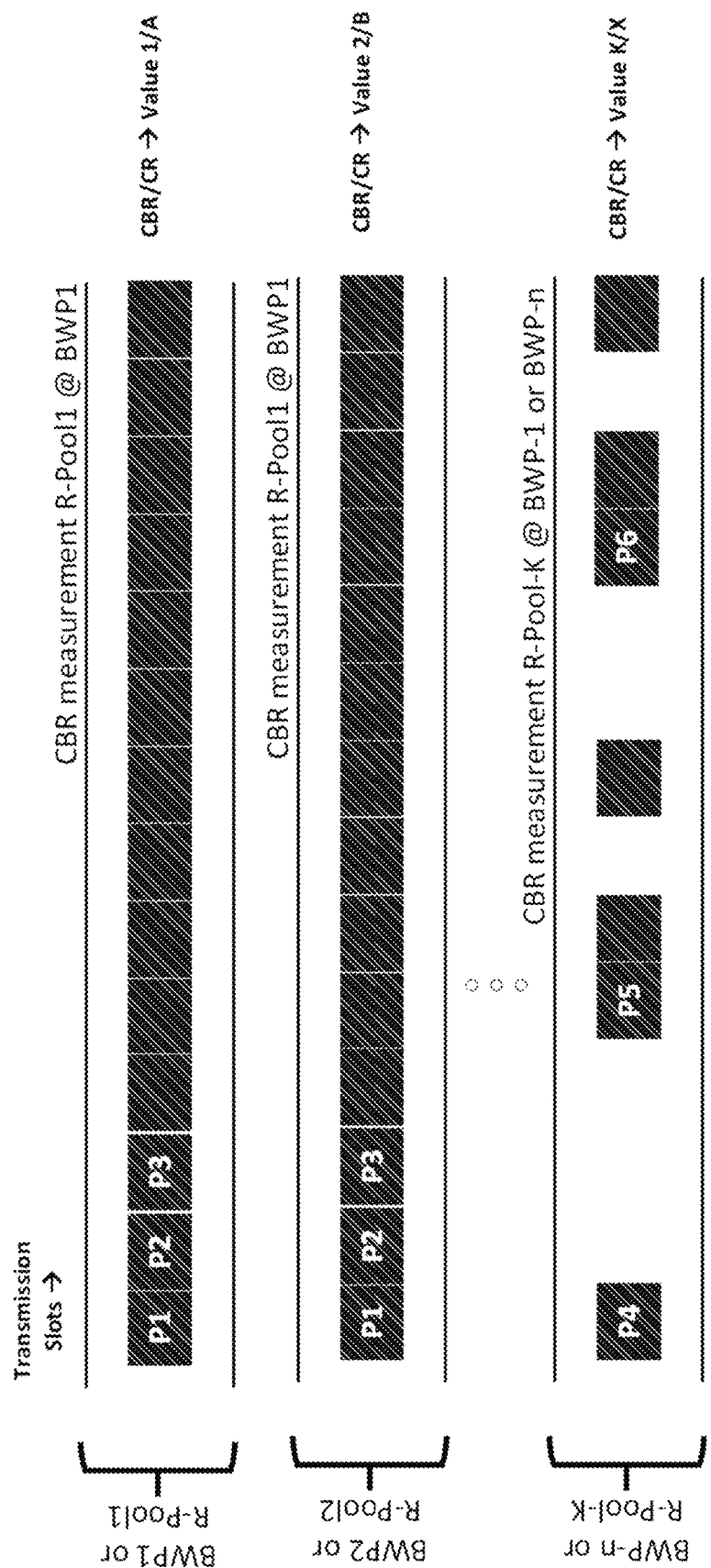
FIG. 2 depicts an example of CBR/CR resource sorting for congestion control according to some embodiments herein.

According to this embodiment, the UE (or the gNB if the gNB controls resource allocation) may be configured to sort the resources or resource pools in one or more BWPs either in ascending order or in descending order based on, e.g., the CBR/CR measurements, as in the example of FIG. 2 depicting packets denoted P1, P2, P3, P4, P5, P6, . . . n in respective transmission slot. FIG. 2 also shows resource pools R-Pool1, R-Pool2, . . . . R-Pool-K. R-Pool1 is shown configured in Bandwidth Part BWP-1; R-Pool configured in BWP-2, and R-Pool-n configured in BWP-K. CBR/CR→value 1/A corresponds to a CBR/CR measurement performed on resource pool R-Pool1, CBR/CR→value 2/A is a value corresponding to a CBR/CR measurement performed on R-Pool2 . . . , and CBR/CR→Value K/X corresponds to a CBR/CR measurement performed on R-Pool-K. K and X may take any values and may be design parameters/values.

Once a data packet arrives to the UE buffer and according to the QoS type of the data packet, the suitable resource pool(s) with the appropriate CBR and/or CR value is (are) selected for transmission. The UE (if the UE performs the distributed congestion control) or the gNB (if the gNB performs the centralized congestion control) is configured, according to some embodiments, to select or assign the right resources or resource pools according to the following metric:

1. Select low CBR: In this embodiment, if the data packet has a high QoS (e.g. important 5QI or high priority packet or minimum communication range), the data packet gets identifiers for early transmission.

The high QoS data packet is assigned to the first available resource pool with the lowest CBR/CR value, where the CR is selected based on the QoS and the CBR. A mapping is required, which can be either defined by the upper layers or it can be pre-configured. As an example, a CBR value less than or equal to a threshold, denoted CBR_high_priority, may be assigned to the resource pool. CBR_high_priority may be set to larger than or equal to 65%. Hence, according to an embodiment, if the data packet has a high QoS, the resource pool having a CBR/CR value below a certain threshold is selected.

2. Select higher CBR: In this embodiment, if the data packet has a QoS profile for low/ultra-low latency services or the data has 5QI for low latency, any or all of the resource pools with a CBR/CR value above a certain threshold are e.g. selected. As an example, a CBR/CR value larger than or equal to 65% (or larger than or equal to 70 or larger than or equal to 80), is selected, where the CR can take a high transmission probability. The latency requirements may be less than 5 ms or less than 1 ms or 2 ms respectively.

For this, one or more CBR values and one or more CR values for different latency requirements may be defined. An example of possible values can be e.g.:
   CBR_Latency_1 ms→CR 1
   CBR_Latency_2 ms→CR 2
   . . .

This will help in ensuring that the transmission opportunities are available to the UE. The mapping of the CBR to different CR values ensures high granularity for meeting different latency requirements and the channel access becomes more fairly distributed or split amongst the UEs.

For example, for a URLLC service where the latency requirement is e.g. 1 ms, the UE can utilize the channel for x ms, e.g. CR1. If the latency is not critical then the UE can access the channel for y ms e.g. CR2.

The latency requirements depend on e.g. the packet delay budget.

3. Select multiple pools/carriers for duplication: In this embodiment, if the data packet has high reliability the following may be applied:

a. By default, resource pools with CBR/CR values lower than a threshold may be selected. An example of a CBR/CR threshold value is 60%.

b. If resource pools have CBR/CR values higher than a certain threshold, e.g. higher CBR/CR values than required, data duplication on multiple resource pools/carriers may be performed. As an example, if the CBR value is higher than a threshold e.g. 80%, the resource pool is almost overbooked and therefore there could be no further transmissions on this resource pool. This may trigger packet data duplication on other resources or on other carriers. The data duplication may occur on different carriers/pools at the same time or at consecutive times.

c. For data duplication, the sequence of the resource (pool) selection may follow the CBR/CR selection criteria as in 3.a and 3.b above. This means select the resource pool having a lower CBR as compared to the other resource pool on which duplication is triggered.

4. For minimum communication range, an example of a QoS based stepwise congestion control algorithm is presented below:

The order of the steps below can be configured by the network or pre-configured. Further, the associated value of the CBR and the corresponding CR can be computed by the UE; or configured by the network or pre-configured to the UE.

For congestion control, the QoS resource pool selection E1 presented earlier is performed, in a stepwise fashion, based on the QoS as presented in Algorithm I below:

It is assumed that the UE generates data packets for transmission. Hence, the UE has one or more data packets in its buffer.

Algorithm I:

According to an embodiment:

1. A UE may be configured to perform CBR/CR measurements on all TX resource pools 1 to K (see FIG. 2). Note that this step may be either pre-configured or triggered by the gNB/network.

2. The UE may be configured to analyze the QoS information of one or more data packets and the UE may be configured to sort the packets in the QoS categories stated earlier to assist later transmission. The QoS categories including the QoS fields metric comprise: a communication range, in steps in meters or radio-distance in meters dBs; a packet priority; a packet delay, a packet reliability; link quality in terms of CSI/CQI, RSSI, RSRP, RSRQ; UE link establishment quality; barrier quality and statistical link-quality history.

a. If the data packet has high reliability or low latency or high-priority, which means that the packet has a low packet delay budget, the UE may be configured to select the resource pool according to E1 specifically for the QoS category.

b. If the packet has a destination address or is allocated to a digital radio bearer (DRB) marked with high QoS value, or is allocated to a Sidelink Radio Bearer (SLRB) marked with high QoS value, the UE may be configured to select a resource pool congestion resolution as in a for Algorithm I using the same method as for high priority transmission.

c. If the UE could not classify the QoS based on a priori information, the UE may be configured to categorize the packet(s) selection for destination UEs in certain communication ranges as follows in relation to Table 1:

TABLE 1

Example for minimum communication range and priority

| Packet-Destination-ID: | Packet-Src (source)-ID: (UE0) | Phy/Radio distance < L [m] (Minimum communication range) | QoS-Priority |
|---|---|---|---|
| RX-UE1 | TX-UE0 | <L1 [m] (near) | High (0) |
| RX-UE2 | TX-UE0 | <L2 [m] (mid-far) | Moderate (1) |
| RX-UE3 | TX-UE0 | <L3 [m] (far) | Low (2) |
| . . . | . . . | . . . | . . . |

As shown in Table 1, the same UE (TX-UE0) may transmit to multiple RX-UEs (UE1, UE2, UE3, . . . ). Assuming that in the buffer of TX-UE0 there are multiple packets with different QoS. A transmission of a higher QoS packet is transmitted to the nearest UE (RX-UE1) (shortest minimum communication range), a packet with moderate QoS is transmitted to RX-UE2 (mid-far minimum communication range) and a data packet with a low QoS is transmitted to RX-UE3 at a higher minimum communication range.

Figure 3:
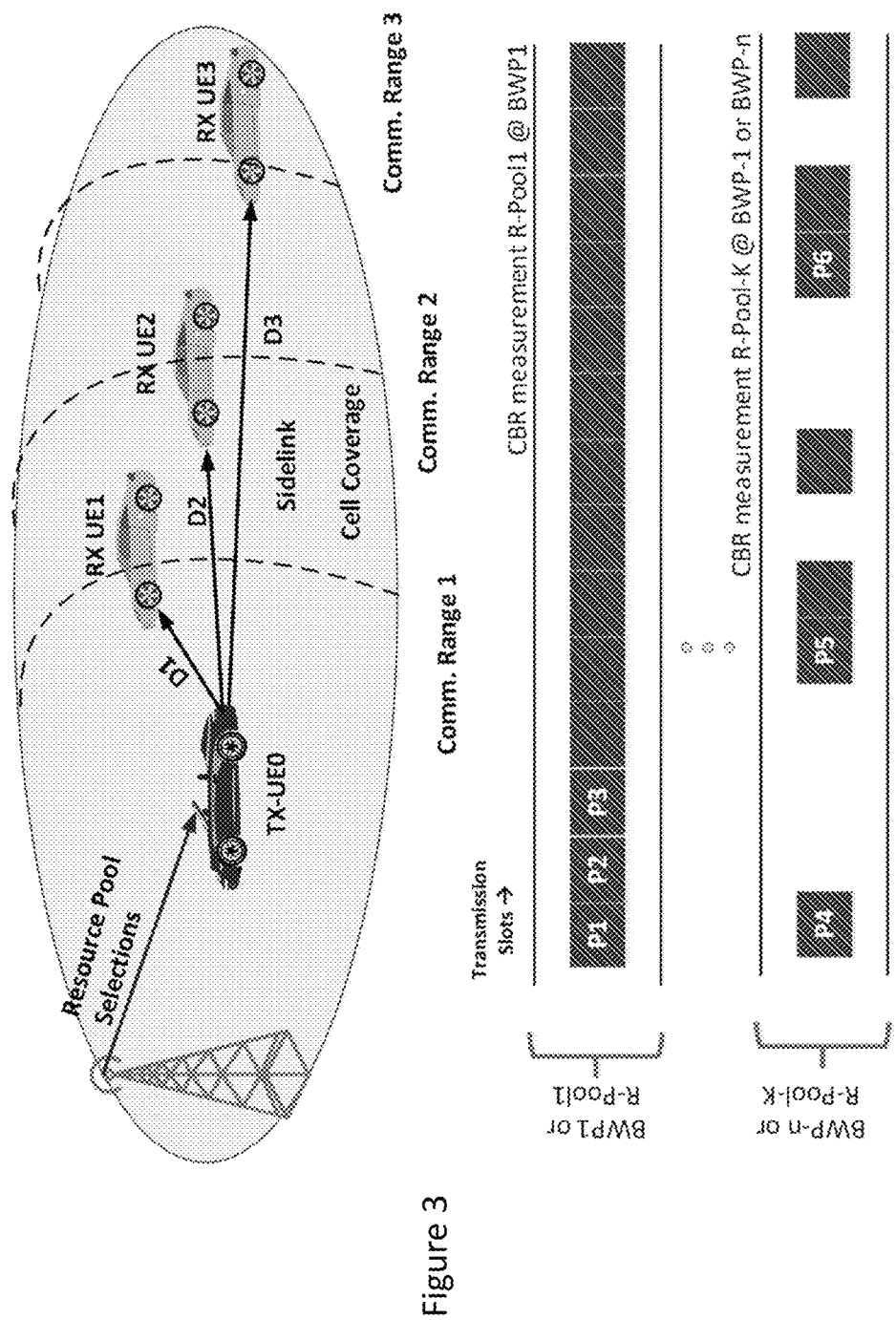
FIG. 3 depicts an example of QoS sorting for congestion resolution, wherein different communication ranges are depicted.

FIG. 3 illustrates a network scenario involving the four UEs, TX-UE0, RX-UE1, RX-UE2 and RX-UE3. The communication ranges are also shown. FIG. 3 also illustrates a QoS sorting for congestion control, which means that the UE (e.g. TX-UE0) takes the QoS associated with the packets (P1, P2, P3, P4, P5, P6, . . . ) to be transmitted. TX-UE0 compares the associated QoS and the congestion levels (CBRs) and then TX-UE0 sequentially, from higher priority to lower priority, transmits the packets.

Hence, with reference to FIG. 3 and table 1, if a data packet is transmitted by TX-UE0 within a low minimum communication range and the data packet has a high QoS, a resource pool or resources within a resource pool having a CBR and/or CR value below a certain threshold is (are) selected. Otherwise, if the data packet is transmitted within a higher minimum communication range, the QoS requirements are lower (e.g. moderate or low).

The resource pool selection may be performed according to E1 previously described.

3. Selection of the transmission packet duration and period is selected according to the method below disclosing a resource pool access mechanism to reduce congestion, wherein resources may be allocated periodically for the UE with different period, time slot and resources which sizes are dependent on the QoS flow as described below.

Resource Pool Access Mechanism to Reduce Congestion

One or more resource pools may be configured where at least one resource pool may be used to transmit data and optionally one or more resource pools may be configured to resolve congestion. In an exemplary embodiment, two pools may be just one pool for transmission and/or for congestion resolution.

According to an embodiment, the UE is configured to measure the CBR and/or CR on each of the available resource pools and the UE is configured to sort them from low CBR/CR (less congested) to high CBR/CR (highly congested).

If the UE is allocated to a high CBR resource pool and the UE starts to receive high/priority QoS and/or low latency (low packet delay budget) data packets or messages, the UE may be configured to start the congestion control mechanism (because of these newly arriving packets) as follows:

In case of mode 1 and/or mode 2, the network assisted congestion resolution shall be:
  The sidelink active TX-UEs may request new sidelink (SL) resource configurations from the network with a CBR report for multiple resource pools sorted from low to high (e.g. using a CBR/CR congestion threshold).
  The UE may suggest to the network or provide the network node with information on the resources pool(s) that has (have) less congestion by identifying the resource pool(s) with CBR/CR/any-congestion-threshold value(s) less than or above an identified/specified/(pre) configured threshold. If the network node (or gNB) accepted the new resource pool suggestion control results i.e. the gNB accepts the information provided by the UE, the gNB performs a congestion control mechanism as follows:
Resources may be allocated periodically for the UE with different: period (P), time slots (T) and resources (F). The sizes of P, T and F are dependent on the QoS flow. P is a period for the allocation; T includes information on the time slots or a transmission time and F indicates information on the allocated resources.
Once the UE receives its new congestion control message, i.e., in the downlink control channel information indicating P, T and F, the UE may be configured to start a timer to:
  Extend the period P based on the packet/UE QoS and QoS flow (bearer concept), e.g., for non-GBR (non-Guaranteed Bit Rate) or for lower GBR values, wherein GBR is a QoS parameter. Hence the UE is configured to extend the period for the allocation P based on the QoS of the packet and/or based on a QoS flow.
  Reduce the transmission time T if more than one slot is allocated per transmission occasion (TO), e.g. for K-receptions window transmission if the reliability metric allows.
  Reduce the allocated band for the allocated resources F as long as the reference symbol design fits, e.g. by increasing the MCS (Modulation and Coding Scheme) and reducing the TBS (Transport Block Size) if the QoS is still supported (e.g. GBR).
In mode 2 (RRC assisted (active (inactive) or the UE is out of coverage) with UE assisted congestion control/resolution, the UE may be configured to perform sensing and/or Listen-Before-Talk (LBT) on the existing resource pools and the UE may be configured to sort the packets according to the CBR/CR values.

Figure 4:
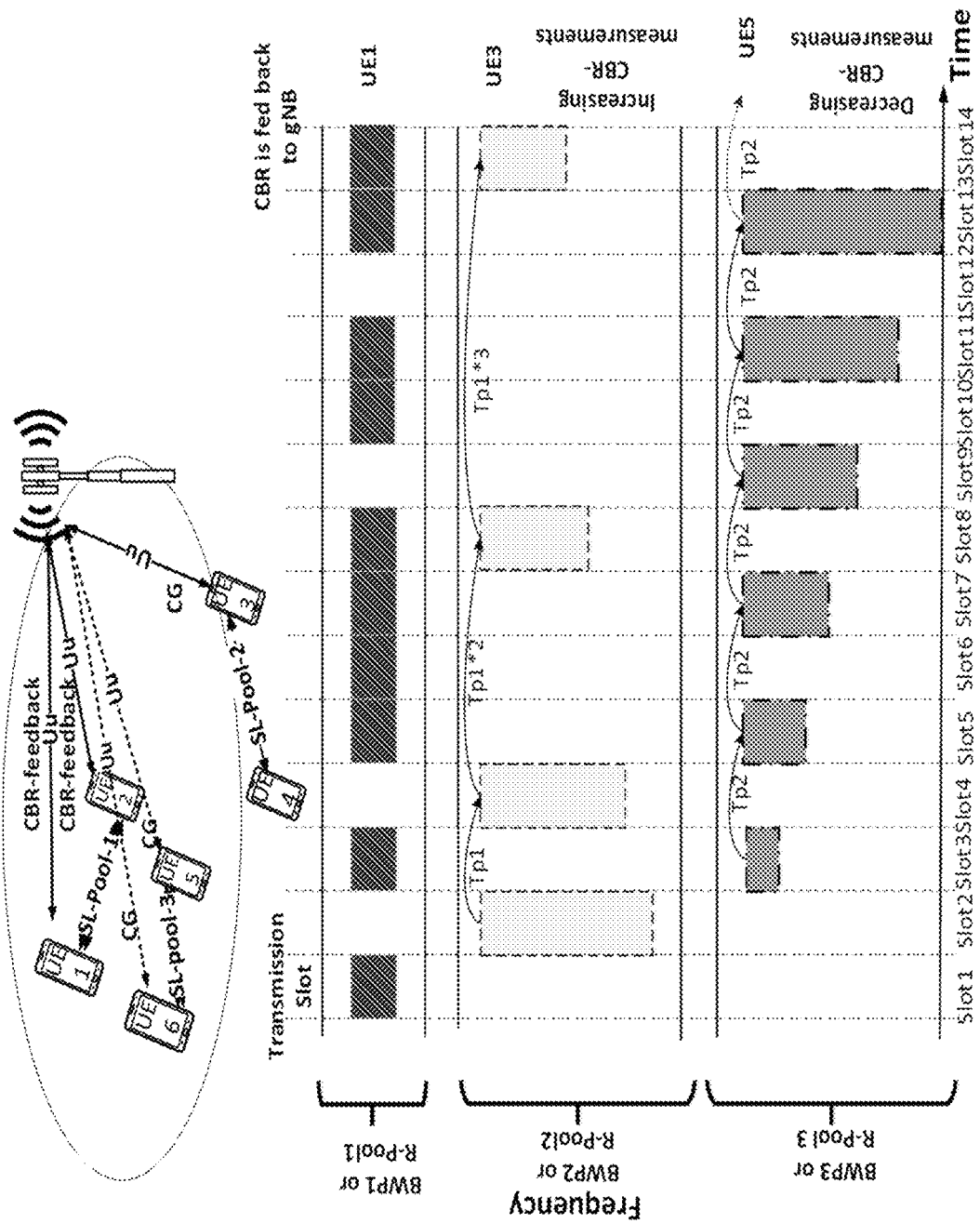
FIG. 4 illustrates an example of resource pool access for adaptive time/date-length-aware congestion control and wherein CBR is fed back by each involved UE to the gNB.

FIG. 4 illustrates a resource pool access for adaptive time/date-length aware congestion control.

FIG. 4 shows that based on the QoS of the packet to be transmitted, the resource pool size could be adapted across time and frequency. If the CBR levels are high the UE will occupy less resources across frequency and will get less chances of transmission. Because of the less chances available for transmission, a high priority packet is transmitted mostly. Once the CBR levels decrease then the packets can occupy more space in the frequency and can be transmitted more often.

E2: QoS Based Sensing and Back-Off for Congestion Control (Mode 2 or Mode 1 with Configured Grants/Grant Free)

According to an embodiment, if the UE is performing resource selection autonomously from configured grants and/or dedicated configured pools and/or pre-configured resource pools, the following applies:

The sensing for CBR measurements based on QoS may be split into a long sensing window and a short sensing window (LBT resource selection). The sensing window and the sensing interval selection may be a function of the QoS profile/flow/field metrics previously presented. As an example, if the UE receives a high QoS data packet in its buffer while the UE is performing CBR/CR measurements during the long sensing window for a low QoS data packet, the UE may trigger a shorter sensing and adjust a back-off timer based on the start of the short sensing window.

The sensing type (long or short) may be a function of the QoS profile/flow/field identified.

According to a proposed sensing mechanism, a sensing window according to an exemplary embodiment is different for different QoS, i.e. the window size or the sensing duration is a function of the QoS, e.g. for low latency, the sensing window is small. This is the case if, for example, the traffic is aperiodic, or event triggered by messages like DENM (Decentralized Environmental Messages). For high reliability, the sensing window is larger e.g. if the traffic is periodically repeating or triggered by CAM (Cooperative Awareness Messages) like messages which are circulated periodically with the vehicles in the vicinity. For different resource pools the sensing is also different based on the priority of the resource pool and whether it is a congestion resource pool.

Figure 5:
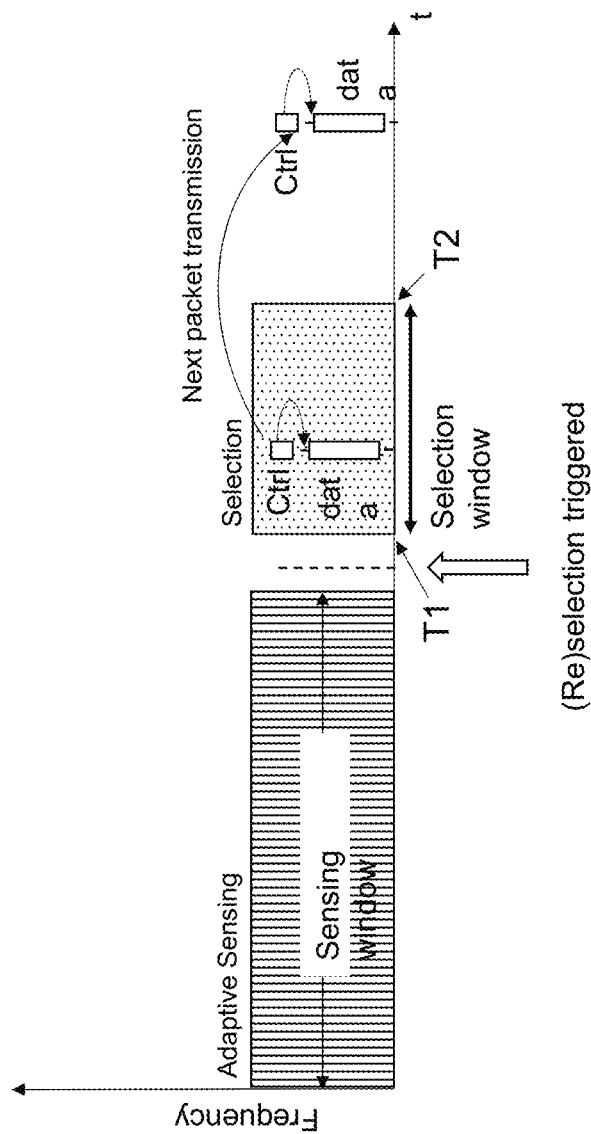
FIG. 5 depicts an example of adaptive sensing for reporting and transmission according to some embodiments.
Figure 6:
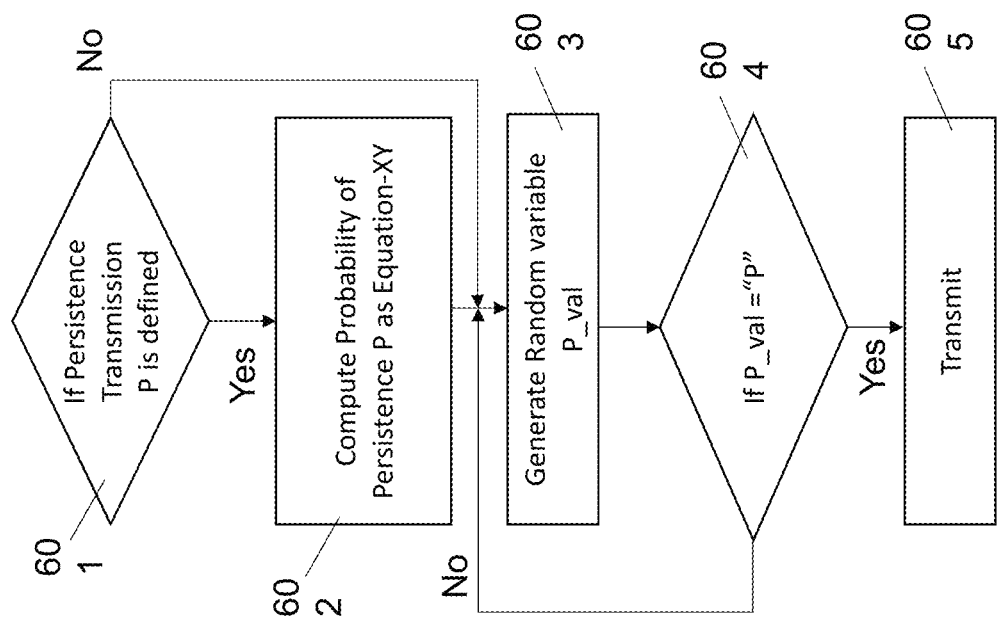
FIG. 6 illustrates a flow diagram involving a probability of persistence for accessing a resource pool for transmission according to some embodiments.

The following algorithm describes more details about the sensing mechanism with reference to FIG. 5 illustrating an adaptive sensing for reporting and transmission. The sensing window and the selection window are shown.

Algorithm 2:
  If a data packet, which may include control information, arrives with QoS requirements, the following applies:
    A sensing window, denoted T_sensing_widow is defined a function of the QoS and the resource pool congestion parameters as given below:
T_sensing_window=f (QOS, Resource Pool Congestion Parameters); where f stands for function and T_sensing_window ∈[0 . . . 1000] T_slots.
    T1 (see FIG. 5) which is the start of the transmission i.e. the start of the selection window may be shorter than a slot, for mini-slot based support.
    T2, which is the end of the selection window, may be adapted based on K-repetitions and the required period boundary P by the QoS of the packet, i.e.
T2=f (QOS [e.g., delay/persistence], CBR [similar to the resource pool access mechanism in Algorithm 1]).
    Once the CBR is measured or sensed during the sensing window and (re) selection for data transmission is performed/triggered, the following applies:
      If the media or the system is busy and a back-off time is proposed, a back-off timer equal to BF_T is calculated based on Equation-XX given by:

BF_T=f(QOS,CBR/CR,Pool(x)_Congestion_Parameters)  Equation-XX else proceed to XYZ-label (presented below)
      If the system or the media is busy, the UE switches to the lowest measured resource pool(s)' CBR/CR/congestion threshold (i.e. switching to a resource pool(s) having the lowest CBR/CR value)
      If the system is free i.e. the CBR/CR congestion threshold is less than a certain threshold (f (QoS)), proceed to XYZ-label, XYZ-label is as follows:
   If a probability of accessing the media is set to P (as in Equation XY), a transmission transmission with probability P is performed, where P is given by:

$P(\text{of\_TX\_on\_Pool}(x)) = f(QOS, CBR/CR, \text{Pool}(x)\_\text{Congestion\_Parameters})$  Equation-XY else, perform a transmission with probability P=100%.

The back-off and access probability for a Pool (x) is explained below:

As presented above the back-off timer can be computed as given by Equation XX which is repeated below:

$BF\_T = f(QOS, CBR/CR, \text{Pool}(x)\_\text{Congestion\_Parameters})$  Equation-XX For example, for ultra-latency, a back-off timer can be between 0 and 0.5 ms*P, where P is the persistence probability for accessing a resource pool for transmission and P can be 0.25, 0.5, 0.75 or 1 with probability 25% each. The back off time is based on the probability P of the UE to access the resource pool.

The back-off timer BF_T (in m-sec) for different QoS required by a service is shown below:

| Back off is (in m-sec) | QoS with services requires |
|---|---|
| ≥0 | Ultra-Low Latency (PDB T_p_0) |
| T1 | Low-Latency service (PDB T_p_1) |
| T2 | High-priority service (Priority, PPPP #x) |
| T3 | Short-communication range (range M meters) |
| T4 | High-reliability service (BLER, PPPR #x) |
| ... | ... |

The back-off timer BF_T (in m-sec) for different CBR/CR values is shown below:

| Back off is (in msec) | CBR/CR value or alike |
|---|---|
| ≥0 | For low CBR/CR |
| T1 | For moderate CBR/CR |
| T2 | For high |
| ... | ... |

The back-off timer BF_T (in m-sec) based on resource pool congestion parameters is shown below:

| Back off is (in msec) | Resource pool congestion parameters |
|---|---|
| T_max | Left-congestion-free pool |
| T_normal | Normal resource pool |
| T_min | Congestion resolution pool |
| ... | ... |

As previously described, the probability of accessing the resource pool may be determined or computed as follows:

$P(\text{of\_TX\_on\_Pool}(x)) = f(QOS, CBR/CR, \text{Pool}(x)\_\text{Congestion\_Parameters})$  Equation-XY E.g.: Packets with high PER (packet error rate) have less transmission if a CR of a resource pool is high (i.e., collected on the historical information of the resource pool occupancy). See an exemplary flowchart in FIG. 6 involving computing the probability of persistence transmission (P) in the event P is either defined or not. As shown if P is defined in 601, the probability of persistence P is computed/calculated as in Equation-XY 602. Then, in 603 and based on a uniform distribution, a random variable P_val is generated. In 604 if P_val is equal to P, then a transmission is performed in 605, otherwise, a new P_val is generated. Hence transmission is performed when P_val is equal to P. So here the channel is contention free and there is no congestion, which allows for transmission of the packet if P_val is equal to P.

Figure 7:
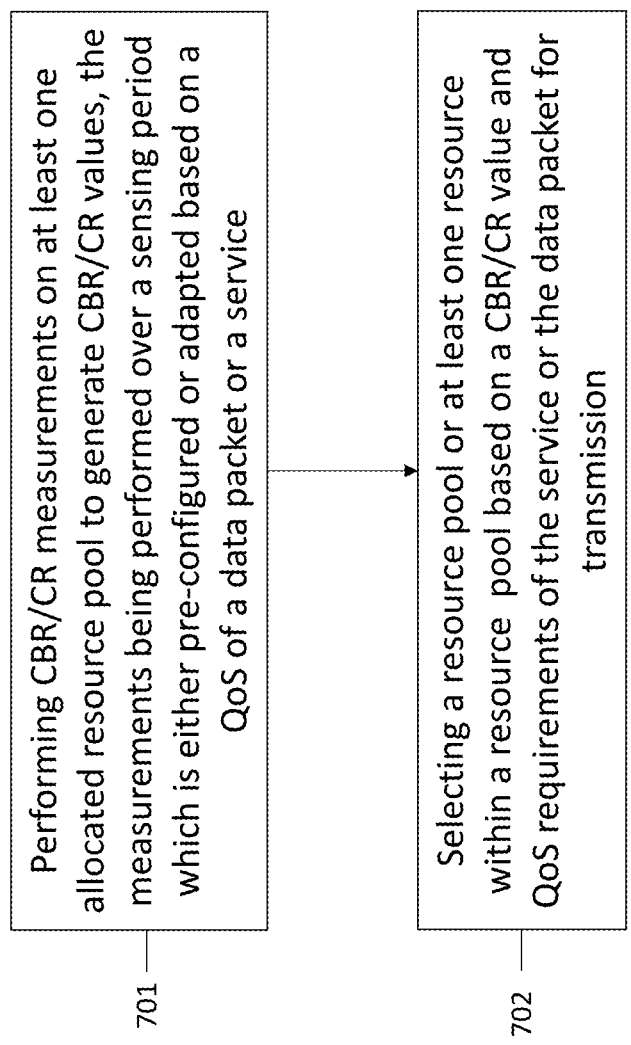
FIG. 7 depicts a flowchart of a method performed by a UE according to some exemplary embodiments herein.

Referring to FIG. 7, there is illustrated a flowchart of a method performed by a UE for congestion control in a wireless telecommunications network, in accordance with the previously described embodiments. The UE is allocated one or more resource pools, the method comprising:

(701) performing CBR/CR measurements on said or more resource pools to generate CBR/CR values, wherein the measurements are performed over a sensing window which is either (pre-) configured by a network node (e.g. a radio base station) or adapted based on at least a QoS of at least one data packet or at least one service; and (702) selecting a resource pool or at least one resource within a resource pool based on a CBR/CR value and QoS requirements of said at least one data packet or at least one service for transmitting the at least one data packet or the at least one service.

The resource selecting may be performed autonomously from configured grants and/or dedicated configured grants and/dedicated configured grants and/or pre-configured resource pools.

According to an embodiment, the method further comprising classifying the resource pools based on the CBR/CR values. According to an embodiment, the method comprising mapping the CBR values with respect to different QoS values.

As previously described, if the data packet has a high priority in respect to QoS, a resource pool or resources within a resource pool having a CBR and/or CR value below a certain threshold is selected. If the data packet is transmitted within a low minimum communication range having high QoS requirements, the method comprises selecting a resource pool or resources within a resource pool having a CBR and/or CR value which is below a certain threshold, otherwise, if the packet is transmitted within a larger or higher communication range, the QoS requirements are lower. If the data packet has a QoS profile indicating a latency requirement below a threshold, the method comprises selecting a resource pool having a CBR/CR value which is below a certain threshold. Examples of thresholds have already been presented.

If a data packet has high reliability and there are multiple resource pools allocated and the resource pools have CBR/CR values higher than a certain threshold, the method comprises performing or triggering data duplication on the multiple resource pools.

According to an embodiment, the method comprises sorting the CBR/CR values from low CBR/CR (less congested) to high CBR/CR (highly congested).

According to an embodiment, if the UE is allocated to a resource pool with a high CBR/CR value and the UE starts to receive data packets or messages having high QoS, the method comprises starting a congestion control mechanism by: requesting sidelink resource configurations and a CBR report from a network node for multiple resource pools; providing the network node with information on one or more resource pools having less congestion according to the sorted CBR/CR values; and if the network node accepts the information provided by the UE, receiving a congestion control message, from the network node, indicating information on allocated resources (F) information on a period for the allocation (P) and information on time slots or a transmission time (T).

According to an embodiment, the method further comprises: starting a timer for extending the period for the allocation P based on a QoS of the packet and/or based on a QoS flow; reducing the transmission time T if more than one slot is allocated per transmission occasion and reducing an allocated band for the allocated resources F by increasing a modulation and coding scheme (MSC) or a transport block size (TBS) if the QoS is supported.

According to an embodiment, if there are multiple resource pools, the method comprises sorting the resource pools in descending order based on the CBR/CR values, and if the data packet has a high QoS, assigning or selecting the first available resource pool with the lowest CBR value selected.

According to an embodiment, the method comprises adapting the sensing duration or the size of the sensing window as a function of the QoS profile or a QoS flow of the at least one data packet or the at least one service.

As previously described, if the UE receives a high QoS data packet in its buffer while the UE is performing CBR/CR measurements during a long sensing window for a low QoS data packet, the method comprises triggering a shorter sensing and adjusting a back-off timer based on the start of the short sensing window.

As previously described, for transmission of the data packet, the method performed by the UE comprises: determining if a medium for transmitting the data packet is busy and that being the case, computing a back-off timer as a function of the QoS of the data packet and at least one CBR/CR value; switching to a resource pool having the lowest CBR/CR value; calculating a probability of persistence P for accessing the media as a function of the QoS and the CBR/CR value; generating a random variable, P_val, of a probability of persistence; and if P is equal to P_val, transmitting the data packet; else transmitting the data packet with a probability of persistence equal to 100%.

According to an embodiment, once transmission is started, using a congestion relation mechanism to monitor or supervise at least one congestion threshold (e.g. CBR/CR threshold) in order to perform adaptive transmission, which includes one or more of: controlling transmission rate/period, power, reducing communication range, assisted by the QoS values.

In order to perform the previously described process or method steps related to the UE, some embodiments herein include a UE 800 (see FIG. 8) for congestion control in a wireless telecommunications network, wherein the UE 800 is allocated at least one resource pool to/from one or more resource pools, the UE 800 comprising a processor 810 and a memory 820 containing instructions executable by said processor 810 whereby said UE 800 is operative to carry out the method according to some example embodiments.

Figure 8:
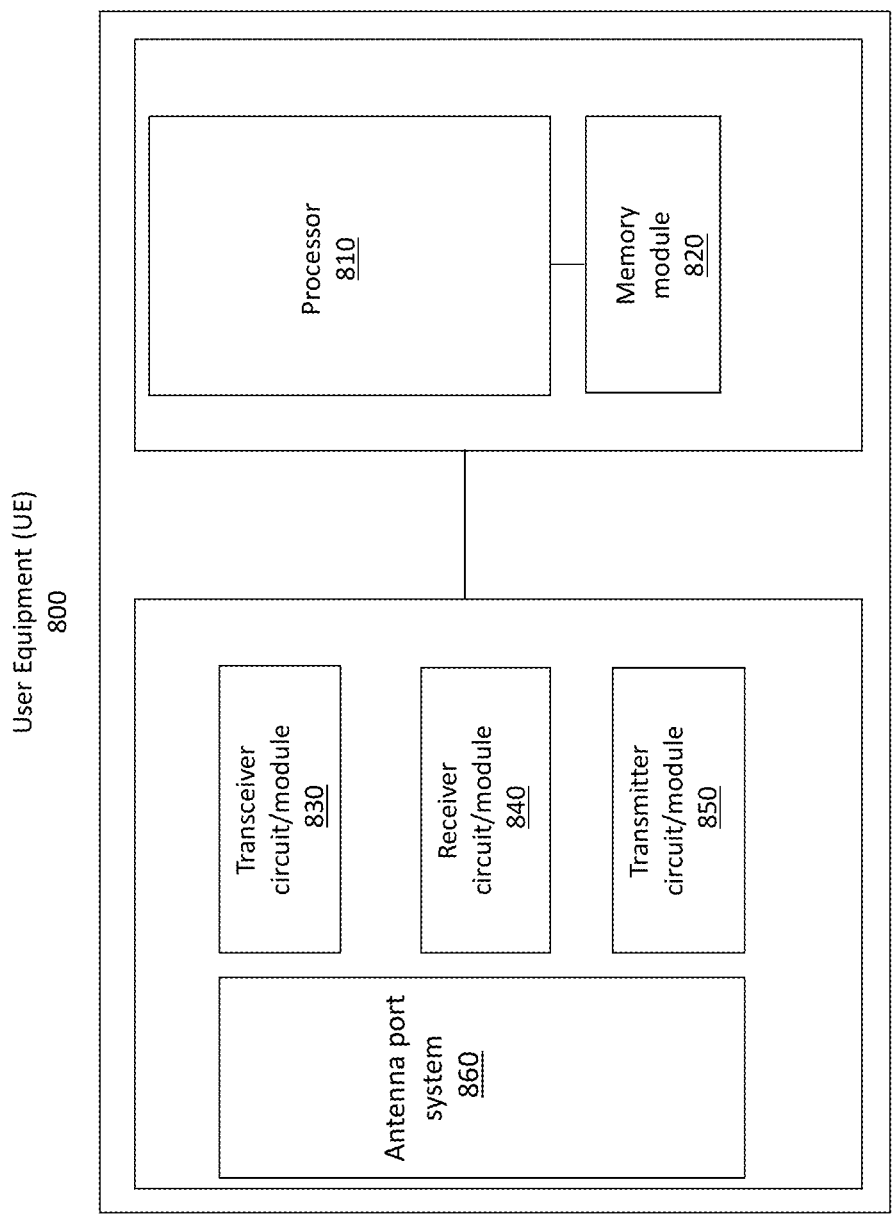
FIG. 8 is a block diagram depicting a UE according to exemplary embodiments herein.

As shown in FIG. 8, the UE 800 comprises the processor 810 or processing circuit or a processing module or a processor or means 810; a receiver circuit or receiver module 840; a transmitter circuit or transmitter module 850; a memory module 820 a transceiver circuit or transceiver module 830 which may include the transmitter circuit 850 and the receiver circuit 840. The UE 800 further comprises an antenna system 860 which may include antenna circuitry for transmitting and receiving signals to/from at least a gNB. The UE 800 is capable for sidelink or D2D communications with objects or UEs in e.g. a Machine 2 Machine (M2M) or V2X scenario or any scenario employing sidelink communications.

The UE 800 may operate in any radio access technology including 2G, 3G, 4G or LTE, LTE-A, 5G, WLAN, and WiMax etc. that support at least sidelink communications.

The processing module/circuit 810 includes a processor, microprocessor, an application specific integrated circuit (ASIC), field programmable gate array (FPGA), or the like, and may be referred to as the "processor 810." The processor 810 controls the operation of the UE 800 and its components. Memory (circuit or module) 820 includes a random-access memory (RAM), a read only memory (ROM), and/or another type of memory to store data and instructions that may be used by processor 810. In general, it will be understood that the network node 800 in one or more embodiments includes fixed or programmed circuitry that is configured to carry out the operations in any of the embodiments disclosed herein.

In at least one such example, the UE 800 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein including some example embodiments. Further, it will be appreciated that the UE 800 may comprise additional components not shown in FIG. 8.

As previously presented, the UE 800 is operative to: perform CBR/CR measurements on one or more resource pools to generate CBR/CR values, wherein the measurements are performed over a sensing period which is either pre-configured by a network node and/or the UE or adapted based on at least a QoS of at least one data packet or at least one service. The UE is further operative to select a resource pool or at least one resource within a resource pool based on a CBR/CR value and QoS requirements of said at least one data packet or at least one service for transmitting the at least one data packet or for the at least one service.

The UE is further operative or configured to classify the resource pools based on the CBR/CR values. The UE is further configured to sort said CBR/CR measurements from low level CBR/CR (less congested) to high CBR/CR (high congested); and based on different Quality-of-Service, QoS, values or levels.

According to another embodiment, based on said different QoS values the UE 800 is operative to prioritize and sort resources among the available resources or resource pools. The UE is further configured to map the CBR/CR values with respect to different QoS.

If the data packet or the service has a high priority in respect to QoS, the UE 00 is configured to select a resource pool or resources within a resource pool having a CBR and/or CR value below a certain threshold.

As previously described, if the data packet has a high priority in respect to QoS, a resource pool or resources within a resource pool having a CBR and/or CR value below a certain threshold is selected. If the data packet has high reliability and there are multiple resource pools, the UE 800 is configured to select the resource pools with CBR and/or CR values below a certain threshold. The UE 800 is further configured to sort the CBR/CR values from low CBR/CR (less congested) to high CBR/CR (highly congested). If the UE 800 is allocated to a resource pool with a high CBR/CR value and the UE starts to receive data packets or messages having high QoS, the UE 800 is configured to start a congestion control mechanism by: requesting sidelink resource configurations and a CBR report from a network node for multiple resource pools; providing the network node with information on one or more resource pools having less congestion according to the sorted CBR/CR values; and if the network node accepts the information provided by the UE; receiving a congestion control message, from the network node, indicating information on allocated resources (F), information on a period for the allocation (P), and information on time slots or a transmission time (T). The UE 800 is configured to start a timer for extending P based on a QoS of the data packet (or service) and/or based on a QoS flow. The UE 800 is further configured to reduce the transmission time T if more than one slot is allocated per transmission occasion and reduce an allocated band for the allocated resources F by increasing the MSC or the TBS if the QoS is supported.

Additional functions performed by the UE 800 have already been disclosed and need not be repeated.

There is also provided a computer program comprising instructions which when executed on at least one processor 810 of the UE according to some example embodiments, cause the at least said one processor 810 to carry out the method according to some example embodiments.

A carrier containing the computer program is also provided, wherein the carrier is one of a computer readable storage medium; an electronic signal, optical signal or a radio signal.

There is also provided a method performed by a radio network node or a radio base station or a gNB for congestion control and wherein the gNB allocates resources to UE(s) for allowing the UE to perform the steps in some of the example embodiments. The gNB may provide necessary information including allocation of resource information and other information, using RRC signaling or other higher layer specific signaling etc.

Hence, the disclosure includes both embodiments wherein allocation of the resources is done by the UE or pre-configured and/or where the allocation if performed by the gNB or any suitable network node. The skilled in the art will readily understand from the present disclosure that the solutions described are not limited to the subject-matter disclosed in the claims.

There is also provided a computer program comprising instructions which when executed on at least one processor of the network node or gNB, cause the at least said one processor to carry out the method steps performed by the gNB enabling the UE to assist in controlling congestion in sidelink communications using e.g. adaptive resource pool access/use as previously described.

A carrier containing the computer program is also provided, wherein the carrier is one of a computer readable storage medium; an electronic signal, optical signal or a radio signal.

As evident from the detailed description, several advantages are achieved by the disclosed embodiments as repeated below:

An advantage with embodiments herein is to reduce latency or at least avoid an increase in latency and support high reliability services having high requirements for e.g. advanced V2X use cases defined in at least 3GPP Rel. 15 and Rel. 16.

Another advantage with embodiments herein is to avoid congestion while satisfying the application requirements.

Another advantage with embodiments herein is to avoid a drop of important messages at e.g. the transmitter side (UE side).

Another advantage with embodiments herein is to ensure reliability at the UE side having lower SINR reception.

Throughout this disclosure, the word "comprise" or "comprising" has been used in a non-limiting sense, i.e. meaning, "consist at least of". Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, D2D, Sidelink, WiMAX, WiFi, satellite communications, TV broadcasting etc. that may employ sidelink communications.

The invention claimed is:

1. A method performed by a User Equipment (UE) for congestion control in a wireless telecommunications network, the method comprising:
- performing Channel-Busy-Ratio and/or Channel occupancy Ratio (CBR/CR) measurements on one or more resource pools to generate CBR/CR values, wherein the measurements are performed over a sensing period which is either pre-configured by a network node and/or the UE, the one or more resource pools being configured for one bandwidth part or one component carrier for sidelink transmissions to one or more UEs;
- selecting at least one resource within a resource pool among the one or more resource pools based on a CBR/CR value and Quality of Service (QOS) requirements of at least one data packet for transmitting the at least one data packet, wherein the at least one resource is selected among candidate resources within an adaptive resource selection window, and wherein the adaptive resource selection window is a time period with a start time and an end time, and the end time is adapted based on the QoS requirements of the at least one data packet;
- if the at least one data packet has a high priority in respect to QoS, selecting resources within a resource pool among the one or more resource pools having a CBR and/or CR value below a certain threshold; and
- transmitting the at least one data packet on the selected at least one resource, based on the QoS requirements of the at least one data packet.

2. The method according to claim 1 comprising: classifying said one or more resource pools based on the CBR/CR values.

3. The method according to claim 1, further comprising mapping the CBR values with respect to different QoS.

4. The method according to claim 1, further comprising: if the packet is transmitted within a low minimum communication range having high QoS requirements, selecting a resource pool or resources within a resource pool having a CBR and/or CR value below a certain threshold; otherwise, if the packet is transmitted within larger higher minimum communication range, the QoS requirements are lower.

5. The method according to claim 1, further comprising: if the data packet has a QoS profile indicating a latency requirement below a threshold, selecting a resource pool having a CBR/CR value below a certain threshold.

6. The method according to claim 1, further comprising: if the data packet has high reliability and there are multiple resource pools, selecting the resource pools with CBR/CR values below a certain threshold.

7. The method according to claim 1, further comprising: if the UE is allocated to a resource pool with a high CBR/CR value and the UE starts to receive data packets or messages having high QoS, starting a congestion control mechanism by:
   requesting sidelink resource configurations and a CBR report from a network node for multiple resource pools;
   providing the network node with information on one or more resource pools having less congestion according to the sorted CBR/CR values; and if the network node accepts the information provided by the UE; and
   receiving a congestion control message, from the network node, indicating information on allocated resources, F, information on a period for the allocation, P, and information on time slots or a transmission time, T.

8. The method according to claim 7, further comprising: starting a timer for:
   extending the period for the allocation P based on a QoS of the packet and/or based on a QoS flow;
   reducing the transmission time T if more than one slot is allocated per transmission occasion; and
   reducing an allocated band for the allocated resources F by increasing a modulation and coding scheme (MSC) or a transport block size (TBS) if the QoS is supported.

9. The method according to claim 1, further comprising: if there are multiple resource pools, sorting the resource pools in descending order based on the CBR/CR values, and if the data packet has a high QoS, assigning or selecting the first available resource pool with the lowest CBR value selected.

10. The method according to claim 1 further comprising: performing resource selection autonomously from configured grants and/or dedicated configured grants and/or pre-configured resources pools.

11. The method according to claim 9, further comprising: adapting the sensing duration as a function of a QoS profile or a QoS flow of at least one received data packet.

12. The method according to claim 9, further comprising: if the UE receives a high QOS data packet in its buffer while the UE is performing CRB/CR measurements during a long sensing window for a low QoS data packet, triggering a shorter sensing and adjusting a back-off timer based on a start of the short sensing window.

13. A User Equipment (UE) for congestion control in a wireless telecommunications network, wherein the UE selects at least one from one or more resource pools, the UE comprising a processor and a memory, said memory containing instructions executable by said processor whereby said UE is operative to:
   perform Channel-Busy-Ratio and/or Channel occupancy Ratio (CBR/CR) measurements on one or more resource pools to generate CBR/CR values, wherein the measurements are performed over a sensing period which is either pre-configured by a network node and/or the UE, the one or more resource pools being configured for one bandwidth part or one component carrier for sidelink transmissions to one or more UEs;
   select at least one resource within a resource pool among the one or more resource pools based on a CBR/CR value and Quality of Service (QOS) requirements of at least one data packet for transmitting the at least one data packet, wherein the at least one resource is selected among candidate resources within an adaptive resource selection window, and wherein the adaptive resource selection window is a time period with a start time and an end time, and the end time is adapted based on the QoS requirements of the at least one data packet;
   if the data packet has a high priority in respect to QoS, select resources within a resource pool among the one or more resource pools having a CBR and/or CR value below a certain threshold; and
   transmit the at least one data packet on the selected at least one resource, based on the QOS requirements of the at least one data packet.

\* \* \* \* \*